United States Patent Office 3,715,331
Patented Feb. 6, 1973

3,715,331
MONOMER SOLUBLE X-RAY OPAQUE
METHACRYLATE PARTICLES
Eugene J. Molnar, La Grange, Ill., assignor to
Coe Laboratories
No Drawing. Filed May 1, 1970, Ser. No. 33,863
Int. Cl. C08f 45/04; A61k 5/02
U.S. Cl. 260—41 B    3 Claims

ABSTRACT OF THE DISCLOSURE

Fine granular methacrylate particles in bead form have aliphatic halides distributed through the beads to provide an X-ray opaque material. The beads are prepared by dissolving the aliphatic halide in a liquid alkyl ester methacrylate and conducting a suspension polymerization of the monomer. Such X-ray opaque beads are surface tinted with colored heavy metal compounds to provide desired colors and to improve radiopacity. These polymers are advantageously soluble in liquid methyl metacrylate monomer so that articles may be molded therefrom.

---

This invention relates to compositions and methods whereby methacrylate particles of small bead size have detectable opacity to X-rays. In particular, the invention relates to providing such X-ray opaque bead particles by utilizing suspension polymerization techniques. It has long been recognized in the art that polymerized plastic articles are radiotranslucent and cannot be detected by X-rays. Such X-ray detection of plastic articles is desirable in various industries to different degrees, but it is particularly desirable to visually detect by means of X-rays such plastic articles in the living body. Unfortunately, the polymerized plastic articles exhibit virtually the same attenuation coefficients as living tissues.

A great many efforts have been made in the art to produce a plastic which could be detectable by X-ray examination when surrounded by human or animal anatomic tissues. Such efforts have included adding radiopaque material to the plastic. The radiopaque materials have been added to polymer powders and to monomer liquids in simple admixture or polymerization procedures. Such attempts have not attained the success which is desirable in this art, principally because the admixtures including the radiopaque material and necessary adjuvants greatly decrease the desired physical properties of the polymerized products. Further objections arise in particular applications, such as a detraction from the desired esthetic qualities of dental prostheses.

The use of plastics in dental restoration has been characterized by a most serious problem which is widely recognized in that art. Plastic dental prosthetic parts, on occasion, are accidentally swallowed, and when such parts enter the air or food passages they cannot be detected by X-rays. Such undiscovered foreign plastic bodies have proven to be fatal if their locations were not promptly ascertained, followed by removal. See Chevalier Jackson, Annales of Roentgenology, vol. 16, Foreign Body in Air and Food Passages, Preface. The same author later reported a study which showed that 34.6% of dental objects removed from such passages comprised artificial dentures, crowns, and bridges. Jour. of the Amer. Dent. Assn., vol. 14, August 1927.

The art has offered no effective solution to this problem since that period, as noted by a French textbook appearing in 1966 which observed that a large number of dental prostheses are transparent to X-rays, and it is a great problem to eliminate such articles when they are in the air passages. Aubrey et al., Chirurgie Cervico-Faciale et Oto-Rhino-Laryngologique, Mason & Cie, page 685. The continued existence of this problem was further noted by Sherman et al., Fatal Traumatic Ingestion of Radiolucent Dental Prostheses, New Engl. J. Med., 279, pp. 1275-6, 1968. They referred to the recognized frequency and hazard of accidental inhalation or ingestion of radiolucent dental prostheses made of acrylic resins, and refer to a recommendation made by another researcher that all dental plastics should contain some radiopaque substances. This problem has been similarly recognized by many practitioners in this art, but no effective solution has been presented. Repeated efforts continue, but no plastic material has been presented to the art which could be detectable by X-rays in the event it is swallowed or inhaled.

Certain barium compounds have been suggested for this purpose, but have not attained desired levels of success. Barium sulfate, for eample, has been noted to be ineffective for attaining sufficient levels of radioopacity at 8% of the acrylic, but grater amounts result in deterioration of the properties of the plastic. Combe, Radiopaque Polymeric Materials, Brit. D.J., 127, pp. 357-8, 1969. U.S. Pat. No. 2,403,794 teaches the use of various thorium and bismuth compounds, but the method of preparing the plastics with these compounds is complicated, the compounds are expensive, and other objections may be directed to the use of such compounds. U.S. Pat. No. 2,439,374 teaches the use of ethylene dibromide as an X-ray opacifying agent in methacrylate plastics, but the use and handling of such a methacrylate mixture is a disadvantage for dental restoration and for other uses. The teaching has not been adopted in the dental art nor, apparently, for other medical or industrial uses. This is believed to be due, in great part, to the objectionable odor and extreme irritation to the skin of the ethylene dibromide compound when it is simply admixed in preparing a "dough" from the liquid monomer and the dry polymer powder. U.S. Pat. No. 2,439,374 further teaches incorporating this material during bulk polymerization, but such bulk articles must be fabricated or otherwise handled to realize advantages in preparing dental prostheses as well as other articles.

The teaching of the foregoing U.S. Pat. No. 2,439,374 are also found in corresponding British Pat. No. 589,701. The British patent further disclosed an attempt using acetylene tetrabromide to make particles which are "extremely opaque to X-rays." The British patent, however, provided no further teaching of molding a final product. In particular, there was no teaching of using a liquid monomer to dissolve or render the polymer moldable in the "dough process." It appears that there was no intention to consider this aspect of the art since the viscosity of the entire charge increases rapidly as the converstion proceeds. After a substantial portion of the charge has been converted to the insoluble polymer form, adequate stirring is impossible. This comes about because even during the early stages of polymerization, the majority of the formed particles coalesce. This agglomeration is due to the lower molecular weight and higher amounts of the particular dispersing agent employed. It is believed that the higher amounts of the particular dispersing agent employed in British Pat. No. 589,701, page 5, lines 39-74, does not give sufficient protection to the polymer mixture during the critical transformation from a monomer droplet form containing the precipitated polymer particles. The clustered polymerized particles adhere to the surface of the reaction vessel, as well as the stirrer. This impairs the quality and utility of the product, since the material cannot be thoroughly washed to free it from the dispersing agent. This process cannot be used on a commercial scale since the "impurity," despite washing, interferes with the later polymerization process, as by dough formation.

It has been found that by replacing the dispersing agent with a higher molecular weight material in much smaller amounts, as described hereinafter, an excellent suspension polymerization procedure is obtained in which the particle size of the formed polymer is controllable. Such formed particles are easily filtered, can be dried simply, and the dispersing agent can be efficiently washed away. The resulting formed polymer is ideally adaptable for dental or other purposes.

It is one important object of the present invention to provide monomer soluble methacrylate particles which contain sufficient levels of X-ray opaque aliphatic halide so that articles formed from said granules may be visually detected upon X-ray examination.

Another important object of the invention is to provide X-ray opaque granular methacrylate plastic in finely divided form so that increased and versatile uses may be realized which are characteristic of such a finely granular form. This includes ease of handling, molding, monomer solubility, and ease of introduction of the plastic to a desired place because of its flowable form.

Yet another important object of the invention is to provide an X-ray opaque methacrylate in finely granular form wherein the particles which make up the granular form have externally attached colored radiopaque heavy metal compounds to attain desired color characteristics in articles molded or formed from said granular methacrylate plastic. It is a feature of this object to obtain, in certain embodiments, desired esthetic appearances in prosthetic plastic articles. Still another feature of this object is to further increase the radiopacity of the particles by using as a pigment the colored heavy metal compound itself.

A still further object of the invention is to provide X-ray opaque methacrylate plastic in finely divided form admixed with a suspension vehicle so that said mixture may operate as an X-ray contrast medium upon ingestion.

Yet still another important object of the invention is to provide simple and direct methods for obtaining granular methacrylate plastics in finely divided form, which are soluble in the monomer, by incorporating aliphatic halide materials in suspension polymerization procedures to thereby obtain radiopaque finely divided beads of intermediate molecular weight.

Yet still a further important object of the invention is to provide methods whereby the improved X-ray opaque methacrylate particles of small but substantially uniform size can be handled in improved ways for obtaining molded plastic articles which can be detected by X-ray visualization.

A further important object of the invention is to provide a method of preparing X-ray opaque methacrylate particles in finely divided form for commercial purposes without requiring extreme precautions to prevent skin inflammation and other health hazards from handling certain irritant aliphatic halides.

Yet another important object of the invention is to provide an improved granular methacrylate plastic composition which includes aliphatic halides to impart X-ray opacity thereto, and to further impart desired bacteriostatic and fungistatic actions to the granules at non-toxic levels.

It has been discovered that highly useful granular methacrylate plastic compositions of intermediate molecular weight can be obtained, which are opaque to X-rays, by utilizing suspension polymerization techniques to incorporate aliphatic halides within the formed granules or beads. Such intermediate molecular weight particles are required in order to render them soluble to a monomer for processing a dough." It has further been found that the resulting granules or beads are obtained as solid, hard, clear and colorless particles, soluble in the monomer, which exhibit sufficient X-ray opacity to be detectable, even when articles are molded or formed therefrom. The X-ray opaque particles exhibit excellent shelf life and are free of any substantial impairment to their physical properties from incorporation of the aliphatic halides, even in large amounts. The aliphatic halide compounds are those which are soluble in the liquid methyl methacrylate monomer prior to undergoing suspension polymerization.

The aliphatic halide compounds are those which contain either bromine or iodine. In order to obtain the successful granular methacrylate plastic. it is required that the particular halide component comprise at least about 50% by weight of the aliphatic halide molecule. In general, it is preferred that the aliphatic compound be a polyhalide so that the desired halide content be sufficiently high, although some monohalides, such as the alkali iodides, have the desired halide level. It is preferred, however, to utilize aliphatic halides which have a plurality of bromine or iodine atoms. Different aliphatic halide compounds may be dissolved together in the liquid methacrylate monomer, but it has been found that aliphatic iodide should not be used alone, but in combination with aliphatic bromides. The aliphatic bromides alone have been found suitable.

The liquid monomer is a lower alkyl methacrylate ester, preferably methyl methacrylate. A liquid monomer may be referred to as being methacrylate ester, but such terms should be viewed as including a mixture of compatible liquid methacrylate monomers. Following dissolution of the aliphatic halide in prescribed amounts in the liquid monomer, the conventional techniques of suspension polymerization are employed. This includes the conventional use of polymerization catalysts such as acyl peroxides or selected azo compounds. The liquid methacrylate ester monomer may further contain cross linking agents, plasticizers of dyestuffs. It should be understood that a methacrylate ester liquid monomer, such as methyl methacrylate, may be copolymerized with other vinyl esters, that is, esters containing polymerizable vinyl groups, such as styrene, vinylacetate, vinylchloride, vinylidene, chloride, dimethacrylates, such as ethylene glycol dimethacrylate, and still other vinyl esters.

In the suspension polymerization method, a suspension vehicle or liquid is employed which is a non-solvent for the polymer or copolymer formed. General suspension polymerization procedures may be followed such as those taught in U.S. Pat. Nos. 2,108,044 and 2,191,520. Other known suspension polymerization procedures may be empolyed to obtain the improved X-ray opaque granular particles of this invention. In general, reaction conditions are observed in order to obtain granules or beads of the desired shape, physical properties, and size. Such reaction conditions require maintaining appropriate reaction temperature, pressure, and particularly, reaction rate. Such conditions have become recognized in the art as contributing to the desirable properties of the resulting granules or beads.

A particular feature of the invention is the recognition that finely divided beads of intermediate molecular weight lead to particularly useful radiopaque "compositions." Such intermediate molecular weight beads or granules are advantageously attached or dissolved by the liquid monomer. It is, accordingly, a feature of this invention that suspension polymerization techniques be employed which lead to such small, intermediate molecular weight beads. In particular, a high molecular weight suspending agent, or lyophilic colloidal agent, such as starch, is used in low concentrations in the suspension reaction, say, less than about 1% by weight. The relative concentration and molecular weight of the suspending agent may understandably depend on the identity of the agent but, generally, an agent having a molecular weight of several thousand will be used in concentrations of less than 1%, by weight, say 0.5%, or even less. Reference may be made to U.S. 2,108,044 for other representative higher molecular weight lyophilic suspending agents.

The particle or bead sizes may vary, but it is desired that the particles be in finely granular form. In general, it is desired that spherical bead forms have a diameter less that about 1 mm. Particle sizes used to advantage are those which pass through Tyler sieves from about No. 80 to about No. 200. Such small granular forms lead to facility in forming or molding articles therefrom, as well as providing an easily flowable form for introducing the polymer as a dry powder into various locations; or as a suspension admixed with a liquid suspending vehicle. Such finely granular form, which is soluble in the monomer, is used to great advantage to form a "dough" which is a deformable plastic. The dough is formed by mixing the dry powder with the acrylate ester liquid monomer, such as methyl methacrylate. Various proportions of the liquid monomer and dry powder may be used to obtain a plastic dough, and to form particular articles from the dough. It will be appreciated that the greater the proportion of powder in the mixture, the more radiopaque will be the resulting dough and any article formed therefrom.

It is preferred that an ultraviolet absorber be incorporated in the beads because of the presence of the aliphatic halides. Other materials may be dissolved in a liquid monomer, as suggested previously, including dyestuffs which impart additional desired color characteristics to the formed polymer, copolymer and articles formed therefrom. Also, a small amount of brominated polyisobutylene may be dissolved in the monomer and polymerized to improve some physical properties, such as impact strength. Representative dyes soluble in methacrylate ester liquid monomers include 1-bromo-4-methyl-amino-anthroquinone, dithiozanine iodine, and others.

A further aspect of the invention includes milling naturally colored heavy metal X-ray opaque compounds to the beads or granules. Such attached pigments impart a desired color characteristic to the particles, and to the articles formed therefrom. Such tinted lower alkyl ester methacrylate particles can be used to make dental prostheses in desired colors and shapes, and for this purpose, high atomic number metal compounds are selected which are non-toxic and which do not dissolve in the saliva. A toxic metal compound such as lead may not be employed for this purpose. In addition to obtaining desired color characteristics, such heavy metal compounds enhance the X-ray opacity of the particles to thereby attain further advantages. The heavy metal compounds are ground to pigment fineness, and then applied by pressure surface contact, as by ball milling.

Representative aliphatic halides useful for this solution are presented in following Table 1, and representative non-toxic heavy metal compounds which are naturally colored and which are X-ray opacifiers are presented in following Table 2.

TABLE 1

| Aliphatic halides | Halide atoms | Percent halide in compounds |
| --- | --- | --- |
| 1. Tetrabromoethane | Br$_4$ | 92.5 |
| 2. Dibromopropanol | Br$_2$ | 73.3 |
| 3. Tetrabromobisphenol A | Br$_4$ | 58.8 |
| 4. Bromoform | Br$_3$ | 94.8 |
| 5. p-Dibromobenzene | Br$_2$ | 67.8 |
| 6. Dibromoethane | Br$_2$ | 85.1 |
| 7. Ethyl iodide | I | 81.4 |
| 8. p-Iodotoluene | I | 59.2 |
| 9. 2,4,6 triiodophenol | I$_3$ | 81.2 |
| 10. Iodobenzene | I | 62.2 |
| 11. 1,3 diiodopropane | I$_2$ | 77.5 |
| 12. Dibromoneopentylglycol | Br$_2$ | 61.2 |
| 13. Dibromotoluene | Br$_2$ | 63.9 |
| 14. Bromopyridine | Br | 50.6 |
| 15. Vinylidene bromide | Br | 81.0 |

TABLE 2

| Heavy metal compound: | Natural color |
| --- | --- |
| (1) Barium tungstate | White. |
| (2) Bismuth benzoate | Do. |
| (3) Bismuth zirconate | Yellow. |
| (4) Bismuth tungstate | White. |
| (5) Bismuth oxychloride | Do. |
| (6) Bismuth stannate | Yellow. |
| (7) Caesium iodide | White. |
| (8) Calcium iodide | Do. |

TABLE 2—Continued

| Heavy metal compound: | Natural color |
| --- | --- |
| (9) Cadmium red C.P. | Red. |
| (10) Cerium zirconate | Ochre. |
| (11) Diiodosalicylic acid | Beige-grayish. |
| (12) Tellurium dioxide | Grayish-yellow. |
| (13) Tantalum pentoxide | Light yellow. |
| (14) Tungstic oxide | Yellow. |
| (15) Tungsten metal | Dark gray. |
| (16) Zirconium tungstate | White. |
| (23) Bismuth titanate | Yellow. |
| (17) Tungstic acid | Slightly yellow-bluish. |
| (18) Molybdenum trioxide | Dark gray-lustrous. |
| (19) Molybdenum disulfide | Dark gray. |
| (20) Molybdenum carbide | Lemon. |
| (21) Cerium oxide | White. |
| (22) Strontium stannate | Beige. |
| (24) Cerium stannate | Light brown. |
| (25) Barium stannate | White. |
| (26) Barium sulfate | Do. |

The invention will now be further illustrated by the following examples in which all parts are by weight; but it should be understood that the disclosed embodiments are intended to be only illustrative and not exclusive.

EXAMPLES 1–13

Radiopaque methyl methacrylate granular polymer

To an enameled cast iron jacketed vessel, fitted with a reflux condenser, a thermometer, a pressure gauge, and a mechanical stirrer with a water seal and an external bearing to prevent contamination of the product, is added a suspension liquid vehicle containing lyophilic suspending agents in water, as follows:

| Ingredient: | Amount |
| --- | --- |
| Distilled water | kilograms 10 |
| Starch | grams 18 |
| Carboxymethylcellulose | do 18 |

The ingredients are mixed under agitation so that no large lumps of partially dissolved material form. When the dispersion or suspension vehicle is free of undispersed materials, a second mixture is added under continued stirring. The second mixture consists of 2700 grams of liquid methyl methacrylate monomer in which are dissolved 27 grams of benzoyl peroxide.

In the second mixture is dissolved one of the thirteen different aliphatic halides or aliphatic halide mixtures listed in following Table 3. Thirteen separate second mixtures are thereby provided for combination with the foregoing first mixture, that is, the suspension vehicle or liquid.

TABLE 3

| Example number | Alipatic halide(s) | Amount, grams | percent aliphatic halide(s) in polymer |
| --- | --- | --- | --- |
| 1 | Tetrabromoethane | 350 | 11.2 |
|   | o,p-Dibromotoluene | 25 |   |
| 2 | Tetrabromoethane | 206 | 11 |
|   | Ethyl iodide | 164 |   |
| 3 | Tetrabromoethane | 85 | 11.6 |
|   | Iodobenzene | 200 |   |
|   | Diiodopropane | 100 |   |
| 4 | Iodopropane | 250 | 10.5 |
|   | p-Iodotoluene | 100 |   |
| 5 | p-Dibromobenzene | 210 | 11.5 |
|   | Tetrabromoethane | 180 |   |
| 6 | p-Diobromobenzene | 400 | 12 |
| 7 | Dibromoethane | 400 | 12 |
| 8 | Dibromobenzene | 350 | 12 |
|   | Bromovaniline | 25 |   |
|   | Bromopyridine | 25 |   |
| 9 | Bromoform | 300 | 15 |
|   | Dibromopropanol | 100 |   |
|   | p-Iodotoluene | 100 |   |
| 10 | Tetrabromo bis Phenol A | 500 | 15 |
| 11 | Tetrabromoethane | 400 | 12 |
| 12 | Tetrabromoethane | 400 | 15 |
|   | Dibromopentylglycol | 100 |   |
| 13 | Dibromoethane | 400 | 17.5 |
|   | Dibromopentylglycol | 185 |   |

The total amount of the lyophilic suspending agents in the reaction mixture is about 0.4%, by weight. The temperature of the reaction mixture is maintained at about 40° C. in the closed vessel, and strong agitation is maintained. Steam is admitted to initiate polymerization, and the reaction is conducted at a slow rate so that all the individual monomer droplets from the second mixture are converted to granular bead polymers. The polymerization is substantially completed when the pressure in the vessel no longer rises. Thereafter, application of heat is stopped, but stirring is continued. The reaction mixture is cooled and starch enzymes are added to facilitate the washing out of the lyophilic suspending agents. After the mixture is cooled, the product is removed from the polymerization vessel, and transferred to a centrifuge where it is washed. The total reaction time including separation of the product, is about two hours. The bead polymer is transferred from the centrifuge to a drying oven held at about 65° C., where drying is completed before the particles are screened. The resulting bead polymers are hard, solid, clear, colorless bodies. The particle distribution sizes selected for general dental purposes are those which pass through a Tyler Sieve of No. 80 and No. 100. The particle size selected for tooth restoration is No. 200 Tyler Sieve.

EXAMPLE 14

Stability testing of radiopaque granular particles

A stability assay was conducted by testing for the release of bromine or bromide ions from the radiopaque bromine containing granular plastic processed in the form of plastic discs. The discs are placed in triple-distilled deionized water in a sealed container positioned on a continuous oscillation rocking shaker held at 37° C. Some of the test discs are roughened with sandpaper to counteract any "skin effect" binding of leachable ions. The "skin effect" is a recognized phenomena in the art, and it arises from contact by the die parts which lead to a compact smooth surface in processing the discs. The following tests were run for twenty-one days:

(1) pH
(2) Conversion floresceine test
(3) Gold chloride absorption changes as measured spectrophotometrically
(4) Coulometric titration by measuring the quantity of electricity required to effect a complete reaction in an electrolysis cell No biologically significant amounts of bromine, hydrobromic acid, or bromine ions were detected in controlled washing of the discs. The biologically significant level is taken as less than about .01%.

It is believed that a chemical union occurs between the resin and the halide ion during polymerization, or that some type of chemical or physico-chemical attachment to the polymer occurs. The aliphatic halide may or may not enter into the polymer as a repeating unit of the chain, however, it may be combined with the final product as a chain stopper.

Use of the halogenated compounds makes it advisable to incorporate ultraviolet stabilizer. Such a stabilizer could be dissolved in the liquid monomer prior to polymerization when using the "dough" process by combining radiopaque granular polymer with liquid monomer. Useful organic ultraviolet absorbers are substituted 2-hydroxy benzophenones or salicylates; substituted 2-hydroxy-phenylbenzotriazoles; substituted cinnamate esters; aromatic-substituted acrylates, and others. The practitioner will consider factors of efficiency of the absorbers, color compatibility, solubility in the monomer and possible loss through volatility in making selections.

EXAMPLE 15

"Dough-process" polymerization for dental prosthesis

A dough is obtained by combining methyl methacrylate liquid monomer with a methyl methacrylate bead polymer prepared by any of foregoing Examples 1–13. In the selected embodiment, three parts by weight of bead polymer powder are combined with one part by weight of the liquid monomer, and the dough is obtained from mixing of the two ingredients. The dough may be polymerized at room temperature in the presence of a tertiary amine curing agent, or at elevated temperatures in the absence of a curing agent. The dough may be used to shape a dental prosthetic article in the usual way.

EXAMPLE 16

Heavy metal compound pigmentation of methacrylate particles

The "master batch" technique is used to impart pigmentation to the radiopaque methacrylate granules. The heavy metal color compounds are first reduced to pigment fineness by grinding in a ball mill, and then such pigment grade powder is, so to speak, hammered onto the particles in a rotatable jar having porcelain balls.

A light tooth color composition is obtained by charging the porcelain jar with radiopaque methacrylate granules prepared according to foregoing Example No. 13, together with heavy metal compounds ground to pigment fineness as well as an initiator. The ingredients are added to the porcelain jar in the proportions listed.

(A) LIGHT TOOTH COLOR

| Ingredient: | Percent |
|---|---|
| Barium sulfate, X-ray grade | 4.745 |
| Zinc oxide (fluoroescent) | 1.48 |
| Bismuth stannate | 0.74 |
| Bismuth titanate | 0.329 |
| Cerium stannate | 0.329 |
| Cerium oxide | 0.987 |
| Benzoyl peroxide | 0.959 |
| Radiopaque methacrylate particles | 90.485 |
| | 100.056 |

The ball milling is continued in the jar until the entire bulk of the granular particles are colored with the pigment placed therein. Two-three parts of the coated methacrylate granules are mixed with one part of liquid methyl methacrylate monomer containing 0.5% dimethyl-p-toluidine to form a dough which is then shaped into a light color tooth prosthesis, and cured at room temperature.

In a similar manner, the following heavy metal compounds of pigment fineness are used to coat radiopaque methacrylate particles prepared by the method of Example 2.

(B) MEDIUM TOOTH COLOR

| Ingredient: | Percent |
|---|---|
| Barium sulfate, X-ray grade | 6.272 |
| Zinc oxide fluoroescent | 2.007 |
| Bismuth stannate | 0.941 |
| Bismuth titanate | 0.439 |
| Brown color | 0.037 |
| Zirconium tungstate | 1.254 |
| Cerium stannate | 0.200 |
| Gray acrylic | 0.094 |
| Benzoyl peroxide | 0.752 |
| Radiopaque methacrylate particles | 87.995 |
| | 99.97 |

Gray acrylic is made by using 1.5 parts tungsten metal powder (ultrafine) pyrohoric, and 98.5 parts radiopaque methacrylate particles. The powder is ball milled onto the particles. By this procedure, small amounts of the tungsten may be evenly distributed. The dough is processed by mixing two-three parts of the coated methacrylate particles with about one part of methyl methacrylate liquid monomer, and heat curing for one-half hour up to 65° C., and for a succeeding half-hour up to 100° C.

In a similar manner, a light denture base material having a pink color is prepared with methacrylate particles, prepared according to Example 11, and the following ingredients.

(C) LIGHT PINK DENTURE BASE

| Ingredient: | Grams |
| --- | --- |
| Barium tungstate | 6.0 |
| Cerium zirconate | 0.1 |
| Cadmium, red, light | 0.03 |
| Cadmium, red, dark | 0.035 |
| Gray acrylic | 1.0 |
| Titanium dioxide | 0.06 |
| Cerium stannate | 0.07 |
| Benzoyl peroxide | 0.75 |
| Radiopaque methacrylate particles | 110.0 |
| | 118.045 |

Two-three parts of the coated radiopaque methacrylate particles are combined with about one part of liquid monomer of methyl methacrylate, and the resulting dough is formed into a pink denture base, and cured by applying heat as above.

The zinc oxide, fluorescent, above is added to counteract the dark appearance of the prosthetic tooth in artificial light. The practitioner with a trained eye can, for example, readily perceive artificial teeth worn by television performers because of their characteristics in artificial light, even when fluorescent zinc oxide is used. Such tell-tale condition is markedly reduced with the heavy metal color combinations used to coat the radiopaque methacrylate particles according to the teachings herein.

The proportion of heavy metal compound in fine pigment form can be varied relative to the amount of methacrylate radiopaque particles to be colored in the master batch method. It is, however, preferred to use one or more heavy metal compounds in a range up to about 10% by weight of the radiopaque methacrylate particles. The range may be varied generally from about 5% by weight up to about 10% weight, depending upon the shade desired for a given thickness of the article, and the type of light in which it will be viewed. The color intensity and radiopacity will understandably increase with greater proportions of the heavy metal compound, but this is generally undesirable for certain applications, such as dental prostheses or restoration.

EXAMPLE 17

A suspending agent is formed by condensing naphthalene sulfonic acid with formaldehyde, and this agent is dispersed in amounts of 20 grams in 500 grams of deionized water. The dispersing agent may be obtained under the trade designation of Blancol, supplied by GAF. It may also be referred to as the sodium salt of condensed naphthalene formaldehyde sulfonic acid.

To the above mixture are added 1 gram of benzoyl peroxide dissolved in 100 grams of methyl methacrylate monomer. To this mixture are then added 5 grams each of acetylene tetrabromide and dibutyl phthalate. The above mentioned dispersion is introduced into a 3 neck round bottom flask provided with a reflux condenser, agitator or stirrer, and a thermometer. The methyl methacrylate solution is poured down the reflux condenser slowly, and evenly dispersed by agitation. The mixture is heated slowly to a temperature not exceeding 83.4° C., and agitation is continued while the temperature is maintained at this level for about 15 minutes. (When the temperature attains a level above 75° C., the water dispersion becomes milky colored indicating initiation of polymerization). The reaction vessel is then cooled because of the increase in viscosity and coalescence of the particles. A portion of the coalesced particles adhere to the vessel and stirrer. Stirring becomes slow and difficult, and the clustered, polymerized particles increase in amount to the point where stirring becomes impossible. This clustered mass is virtually impossible to remove from the vessel, however, some milky liquid may be poured out. Such removed milky liquid is held for four days with no polymerized particle separation. The liquid appears to be a polymerized emulsion, and this observation is supported by the fact that the dispersing agent supplied under the trade designation Blancol, is identified as a peptising agent. The catalogue description of this agent states that it can be used for liquifying a gel, therefore, under such conditions particle formation is not supported. In other words, this particular dispersing agent is used to stabilize an emulsion polymerization process, which is undesirable for particle formation. The clustered mass is broken apart for examination and found to consist of agglomerated particles of different shapes and sizes.

The inclusion of the aliphatic halide X-ray opacifying material within the methacrylate granules or beads results in great improvements in handling and processing because the objectionable odor and toxic irritation of the aliphatic halide, as such, no longer presents a problem. If a practitioner utilizes a polymer powder and liquid monomer, for example, to process a dough for particular articles, and relies only on incorporating said aliphatic halide in the liquid monomer, great problems will be encountered from objectionable odor levels and threat of tissue irritation from handling such monomers. If the objectionable aliphatic halide agent is included in a cured plastic article by means of bulk polymerization, the objections of irritation and odor are removed in the handling of such cured, bulk material. The disadvantage remains, however, that it can be used in only limited ways when compared with the widespread and versatile use of the fine granular polymer of intermediate molecular weight of this invention, having the aliphatic halide incorporated therein. The handling of the aliphatic halide for copolymerization, under the suspension polymerization technique, can be more carefully controlled in commercial preparations. The prepared radiopaque methacrylate particles can be presented to the practitioner who can then safely process such material in forming a dough, or by other means, for forming molded articles therefrom.

It is required that a sufficient amount of aliphatic halide be incorporated so that the desired visualization of the X-ray may be attained. Using the "dough" process to incorporate some desired aliphatic halides in a liquid monomer, as the exclusive source of radiopaque material, has not been successful because of the foregoing problems of odor and irritation. Attempts to include higher amounts in the monomer frustrate handling problems. Therefore, smaller amounts may have been included which do not provide sufficient opacity for X-ray detection. This is overcome successfully by the present invention which allows additions of higher levels in the polymer. Improved distribution of the radiopaque material in the copolymer particles is also provided, and handling of such particles presents no problems of odor or irritation. According to the requirements of this invention, aliphatic halides with required halide content are incorporated at higher amounts of about 10 to about 40% by weight of the polymer to ascertain effective X-ray detection. Yet, there is no adverse effect on the properties of the polymer, including the clear and colorless nature of said bodies. It may further be noted that in uses such as the dental field, the aliphatic halides exhibit some fungistatic and bacteriostatic properties which makes them additionally useful for this application.

The claims of the invention are now presented.
What is claimed is:

1. An X-ray opaque granular methacrylate composition comprising
    finely divided solid clear and colorless beads less than about 1 mm. in diameter and obtained from a suspension polymerization of an alkyl ester methacrylate, said beads being of intermediate molecular weight so as to be soluble in the presence of a liquid methacrylate monomer to form a dough, and an effective amount of an aliphatic halide compound within said beads to impart detectable X-ray opacity thereto, said halide components selected from the class consisting of bromine and iodine, the halide comprising at least about 50% by weight of said aliphatic compound, and said aliphatic compound being present from at least 10% to about 40% by weight of said beads wherein the beads are surface tinted with an externally adhering pressure contacted pigment powder of a heavy metal compound to impart further X-ray opacity as well as a characteristic tint to said clear and colorless beads, and to articles molded from said beads.

2. A granular composition as in claim 1 wherein said methacrylate is methyl methacrylate, and wherein said surface tinted beads have particle sizes which pass through Tyler Sieves from about No. 80 to about No. 200.

3. A granular composition as in claim 2 suitable for dental restoration wherein said heavy metal compounds are non-toxic and insoluble in saliva, said compound being a composite of metal selected from the class consisting of barium, bismuth, cerium, tin, and zirconium, said heavy metal pigment being present up to about 10% by weight of said beads.

References Cited

UNITED STATES PATENTS

| | | | |
|---|---|---|---|
| 2,108,044 | 2/1938 | Crawford et al. | 260—89.5 |
| 2,748,099 | 5/1956 | Bruner et al. | 260—37 |
| 1,602,688 | 10/1926 | Lindsay | 252—478 |
| 2,403,794 | 7/1946 | Goldrick et al. | 260—41 |
| 2,439,374 | 4/1948 | Leader et al. | 252—300 |
| 3,428,514 | 2/1969 | Greer et al. | 161—5 |
| 3,003,975 | 10/1961 | Louis | 117—100 C |
| 3,133,893 | 5/1964 | Newman | 260—41 |
| 3,347,818 | 10/1967 | Howe | 260—41 |

FOREIGN PATENTS 589,701    6/1947    Great Britain.

ALLAN LIEBERMAN, Primary Examiner

J. H. DERRINGTON, Assistant Examiner

U.S. Cl. X.R.

32—15; 117—16; 252—478